United States Patent [19]
Benignu, Jr.

[11] Patent Number: 5,335,960
[45] Date of Patent: Aug. 9, 1994

[54] TONNEAU/TENT SHELTER

[76] Inventor: Edward Benignu, Jr., 921 Dickson St., Marina Del Rey, Calif. 90292

[21] Appl. No.: 880,513

[22] Filed: May 8, 1992

[51] Int. Cl.⁵ .............................. B60P 7/04; B60P 3/34
[52] U.S. Cl. ................................ 296/165; 296/100; 296/26; 135/88
[58] Field of Search ............... 296/159, 165, 100, 164, 296/26, 100; 135/88

[56] References Cited

U.S. PATENT DOCUMENTS

| | | | |
|---|---|---|---|
| 4,061,394 | 12/1977 | Vodin | 296/100 |
| 4,239,247 | 12/1980 | Hinz | 296/171 X |
| 4,310,194 | 1/1982 | Biller | 296/159 |
| 4,607,876 | 8/1986 | Reed | 296/159 X |
| 4,652,040 | 3/1987 | Mahan | 296/159 |
| 5,026,107 | 6/1991 | Hess | 296/37.2 |
| 5,066,063 | 11/1991 | Mullally | 296/100 |

Primary Examiner—Dennis H. Pedder

[57] ABSTRACT

An article of cloth attached to a vehicle of the type that has a cab (10) and attached bed (12), the article of cloth being both a tonneau cover and protective enclosure for humans. Tonneau cover top (18) attached to back of truck cab and perimeter of the truck bed becomes a shelter roof when raised and supported in a position parallel to the truck bed by elongated support members (16) set horizontal to and in the truck bed. Additional material (38) attached to tonneau cover top (18) and stored in the cover when in down position are sides and back of a protective enclosure (38) when released from storage in said tonneau cover/roof in its up position. The sides and back attached to the perimeter of the truck bed and attached to tonneau/roof supported by the elongated support members becomes an enclosed shelter for a human.

4 Claims, 10 Drawing Sheets

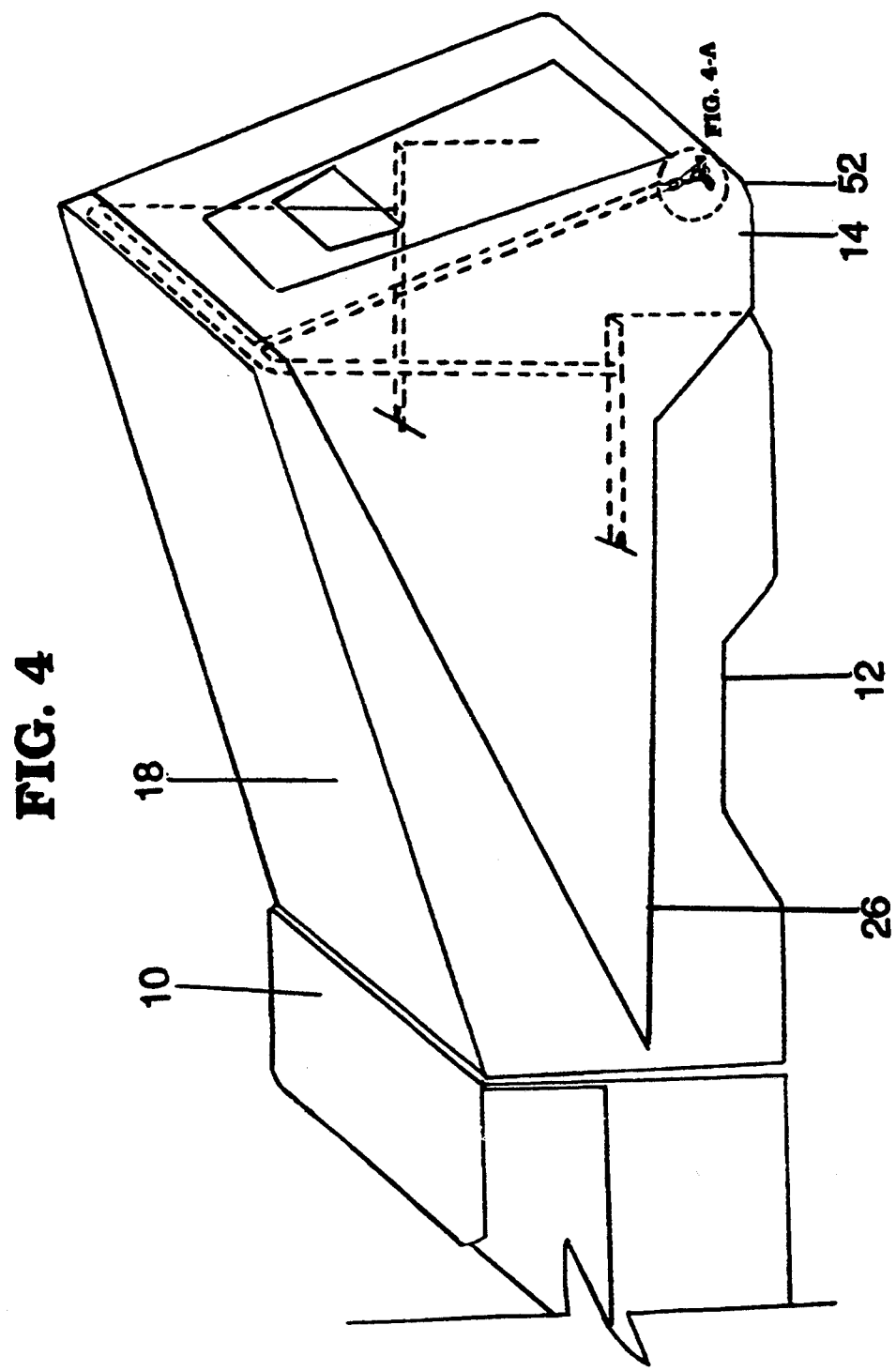
FIG. 4
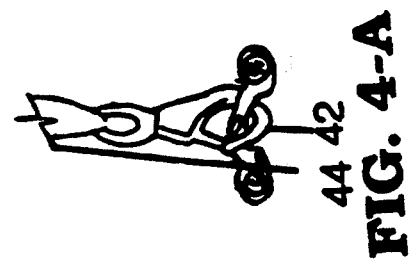
FIG. 4-A

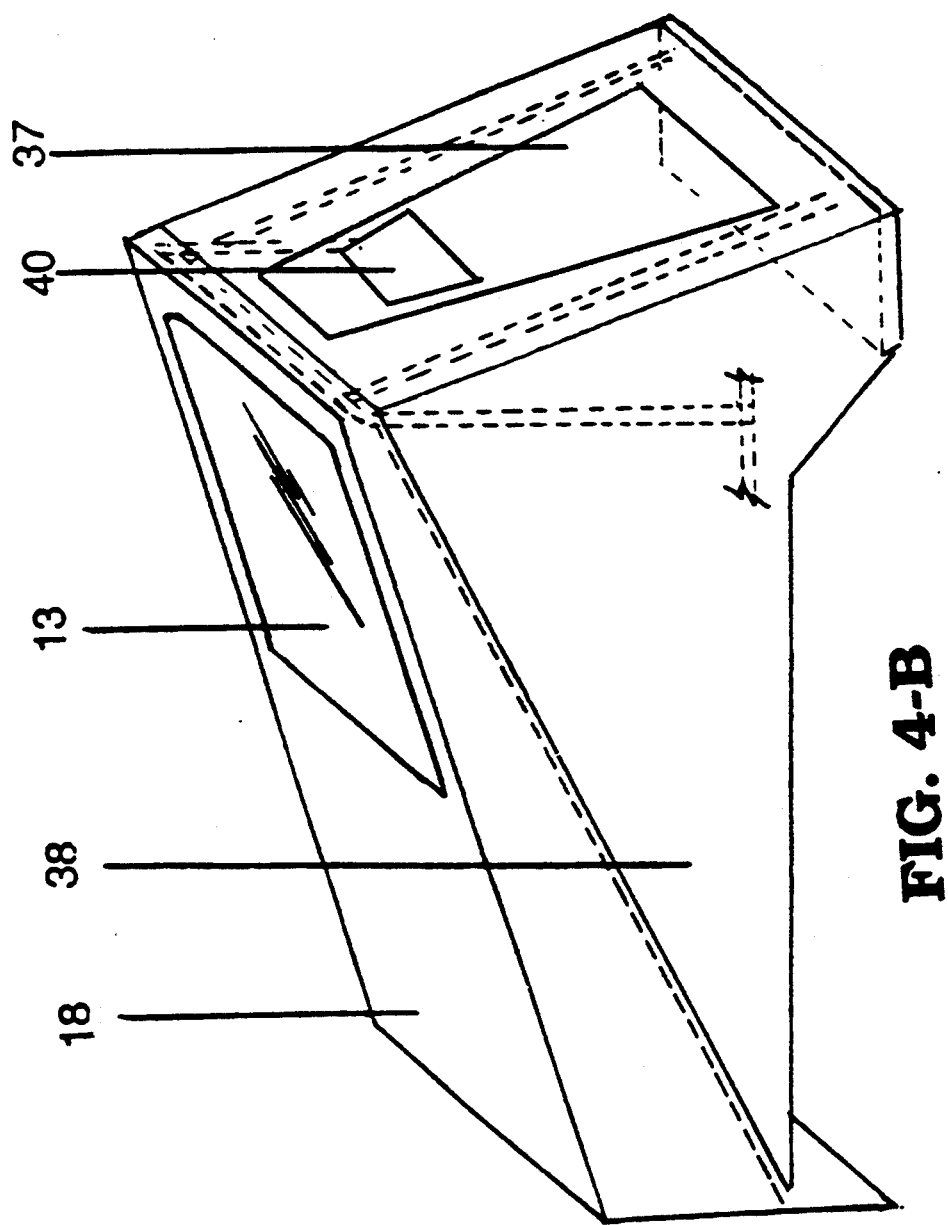
FIG. 4-B

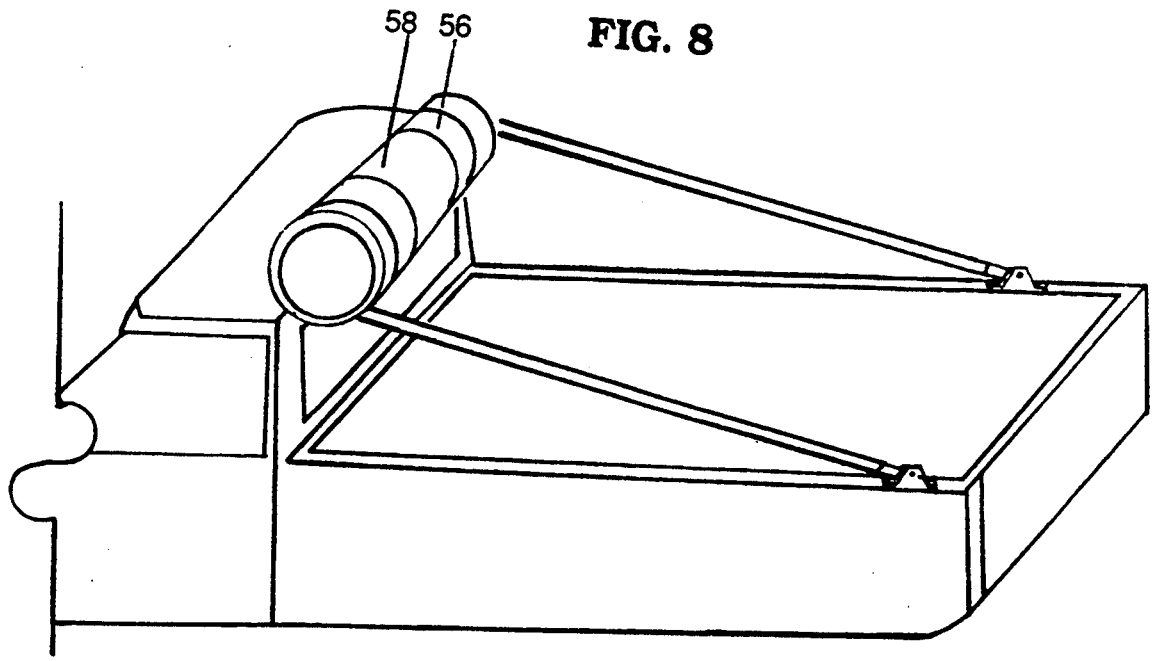
FIG. 8
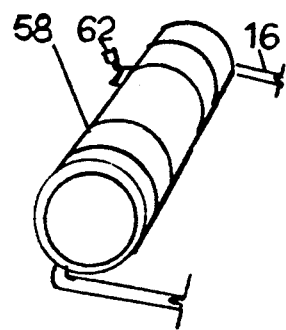
FIG. 8-A
FIG. 8-B
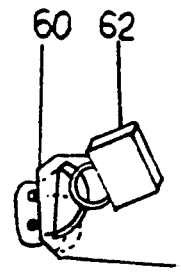
FIG. 8-C
FIG. 8-D
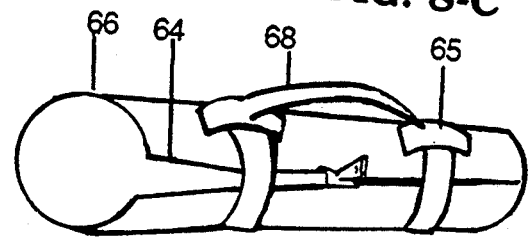
FIG. 8-E

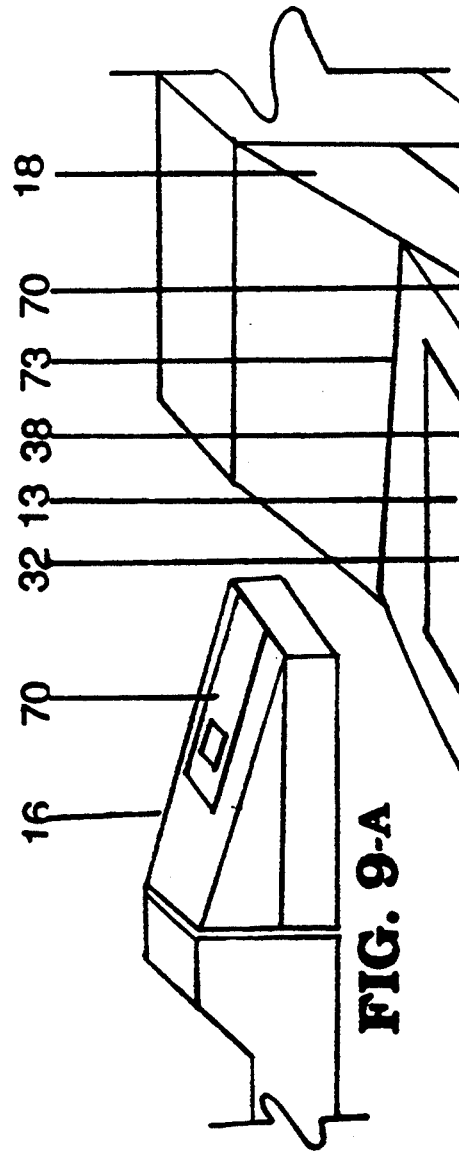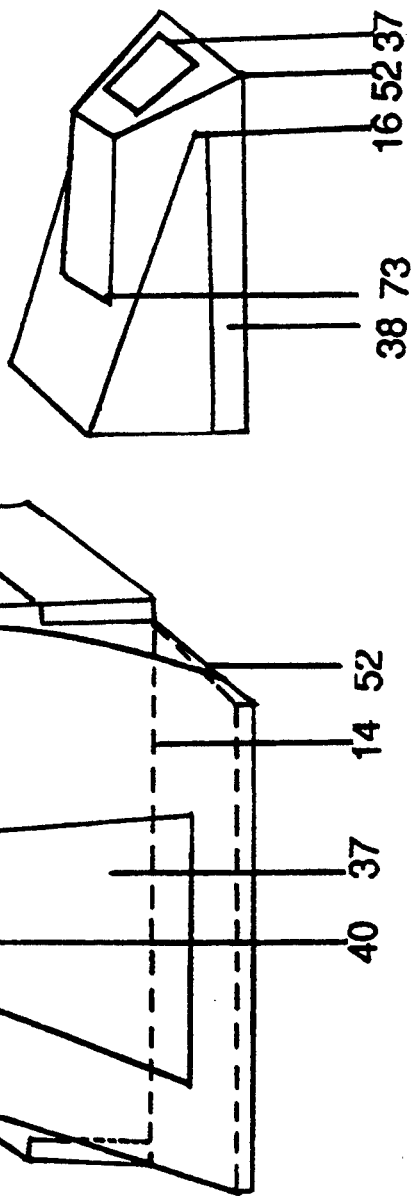

TONNEAU/TENT SHELTER

BACKGROUND

1. Field of Invention

This invention relates to combination truck tonneau cover and outdoor portable shelters specifically a protective vehicle cover and portable above ground tent shelter.

2. Description of Prior Art

Persons requiring outdoor shelter for camping are limited to mobile homes, portable on the ground tents, and other shelters on or above ground which require total break down and assembly upon each use.

The purchase price, upkeep costs and maintenance of the mobile home, along with poor road maneuverability due to size and high charges for camp sites providing full hook up services, make them prohibitive to most campers.

The portable tent requires maintenance, control and management of many assembly parts and the actual assembly and break down upon each use. Upon assembly they often collapse due to inherent weakness of structure or improper assembly.

Tents also required the camper to sleep on the ground or transport portable mattress or other items. Even then the camper is exposed to the ground entry of rain, other elements and exploring animals including insects and reptiles.

OBJECTS AND ADVANTAGES

Accordingly the advantages of the present invention are:

(a) to provide a convertible truck vehicle cover which will both protect the vehicle and its contents and reduce wind resistance for lowered fuel usage;

(b) to allow the use of truck bed for other purposes of hauling when roof detached;

(c) to provide a low cost portable shelter enclosure built into vehicle for ease of use;

(d) to provide a portable shelter which does not require storage outside of the vehicle;

(e) to provide a portable shelter which needs minimal parts for assembly and little assembly time;

(f) to provide an above ground shelter less accessible to entry of water or other results of the outdoor elements; and (g) to provide an above ground shelter less accessible to the entry of ground crawling insects and reptiles and other wild life.

(h) to provide an enclosure which although permanently affixed may be easily detached and portable with storage in a separate bag provided for such purpose.

(i) to provide an enclosure attached to a vehicle of very low cost.

(j) to provide an enclosure that may be use for a myriad of purposes in the outdoors along with camping as use as a wildlife blind for nature photography, hunting, or observation; for driving on to ice where safe and permitted for ice fishing through trap door hole made in the floor of pick up bed.

DRAWING FIGURES

In the drawings, closely related figures have the same number with different alphabetical suffixes.

Figure 2:
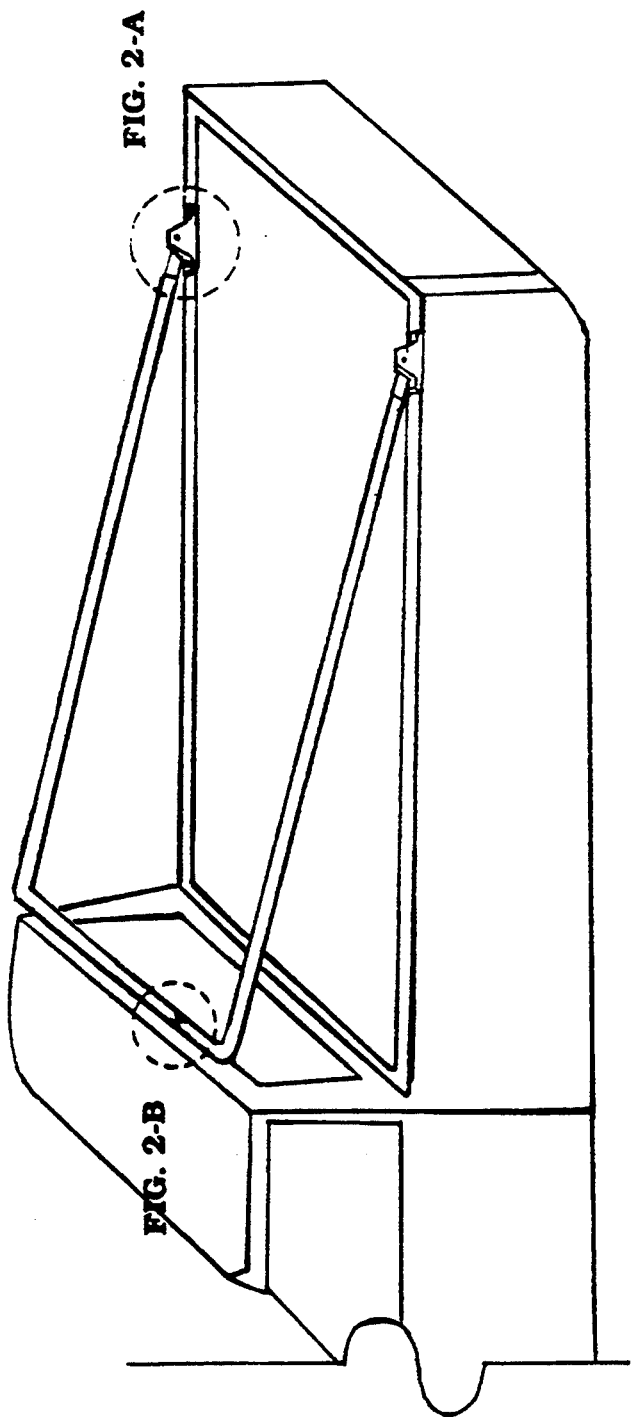
FIG. 2 shows a perspective side and top view of the truck and cab with stylish chrome tube support frame attached and truck bed open for hauling and transporting materials.
Figure 2:
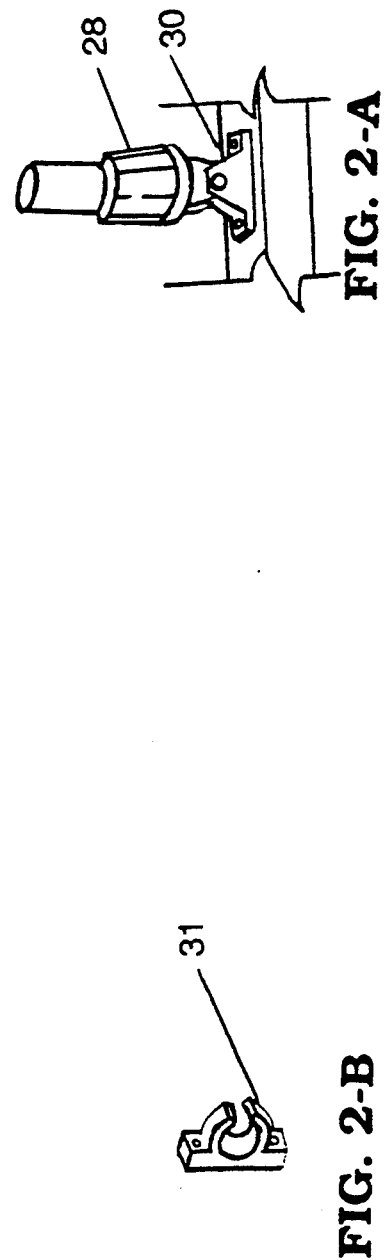

FIG. 2-A shows a blown up view of the tube support holder and hinge connector.

FIG. 2-B shows tube frame support holder blown up.

Figure 3:
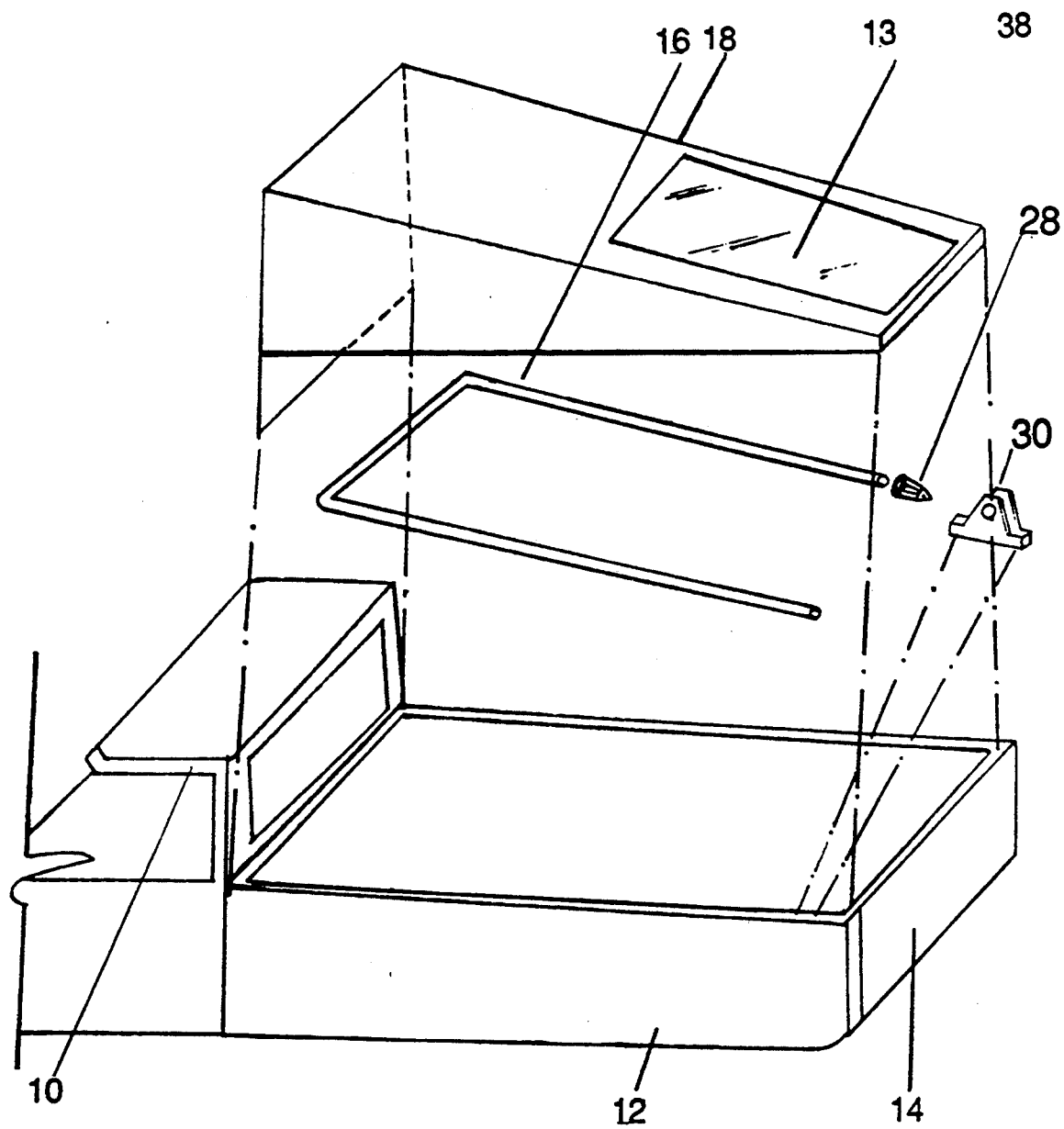

FIG. 3 shows an exploded view of the components

FIG. 4 shows the tonneau tent camper in the up "for shelter use" position.

FIG. 4-A is an exploded view of snap hook and eye used to attach tonneau top to tail gate.

FIG. 4-B is a view of the tonneau roof enclosure top sides and back.

Figure 5:
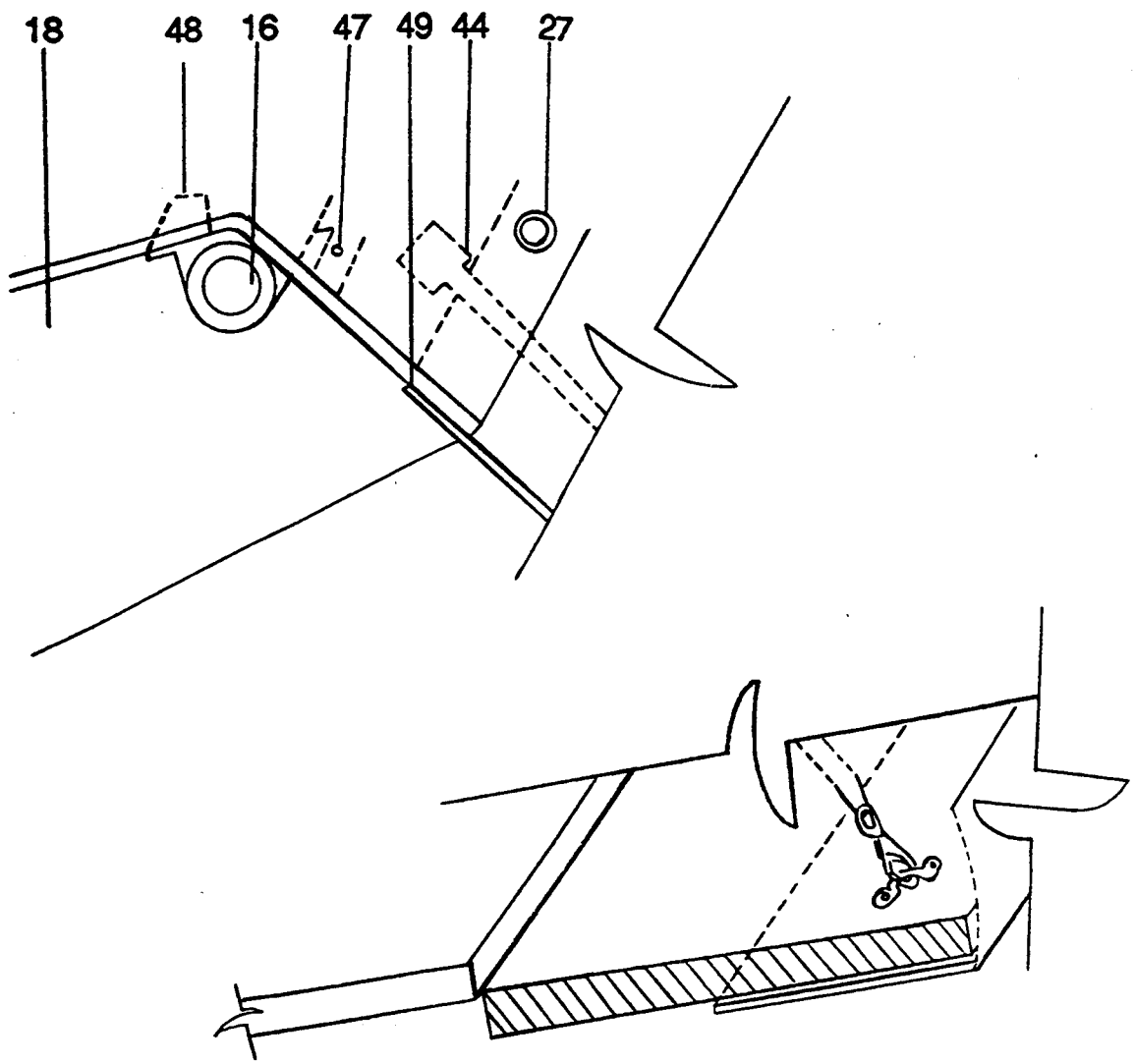

FIG. 5 is a cross section of support tube, tonneau roof/cover, tent material and tail gate.

Figure 6:
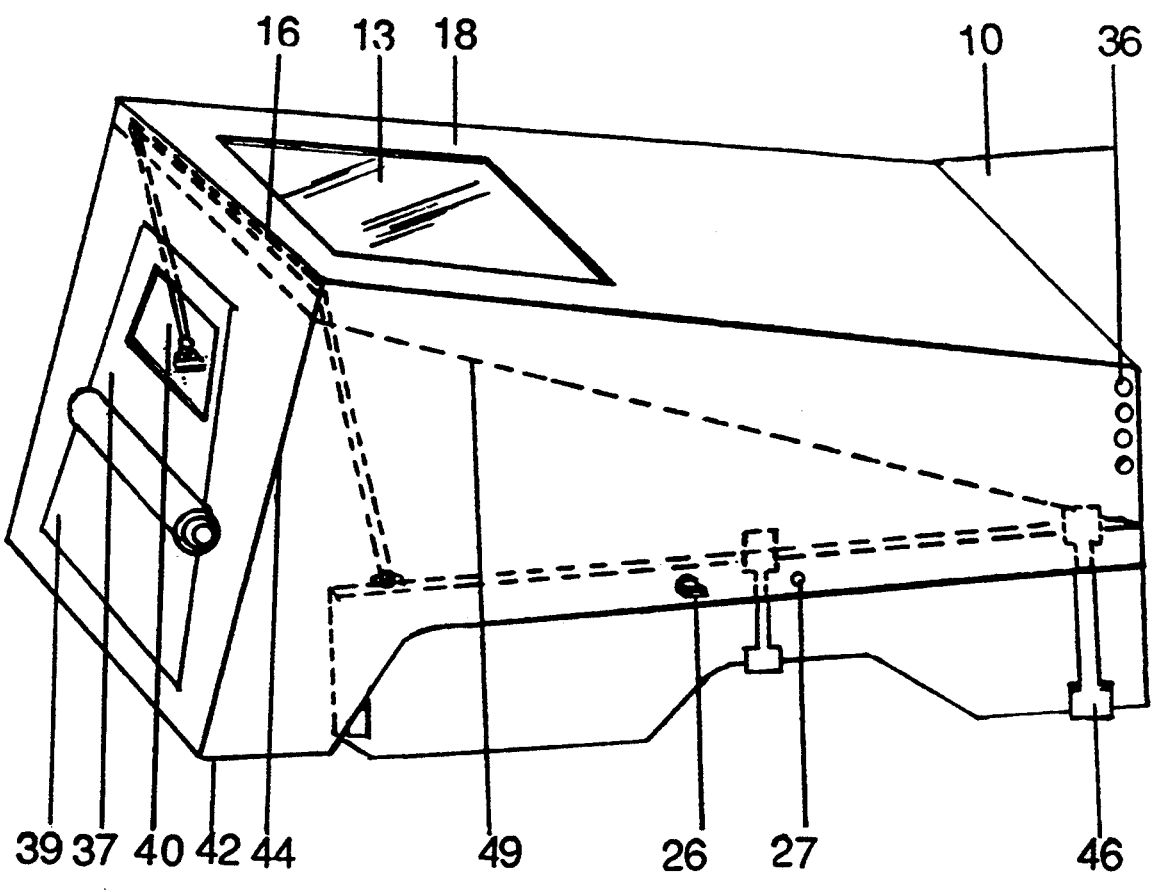

FIG. 6 shows rear and side perspective drawing of tonneau roof and tent shelter in up, "for use" position.

Figure 7:
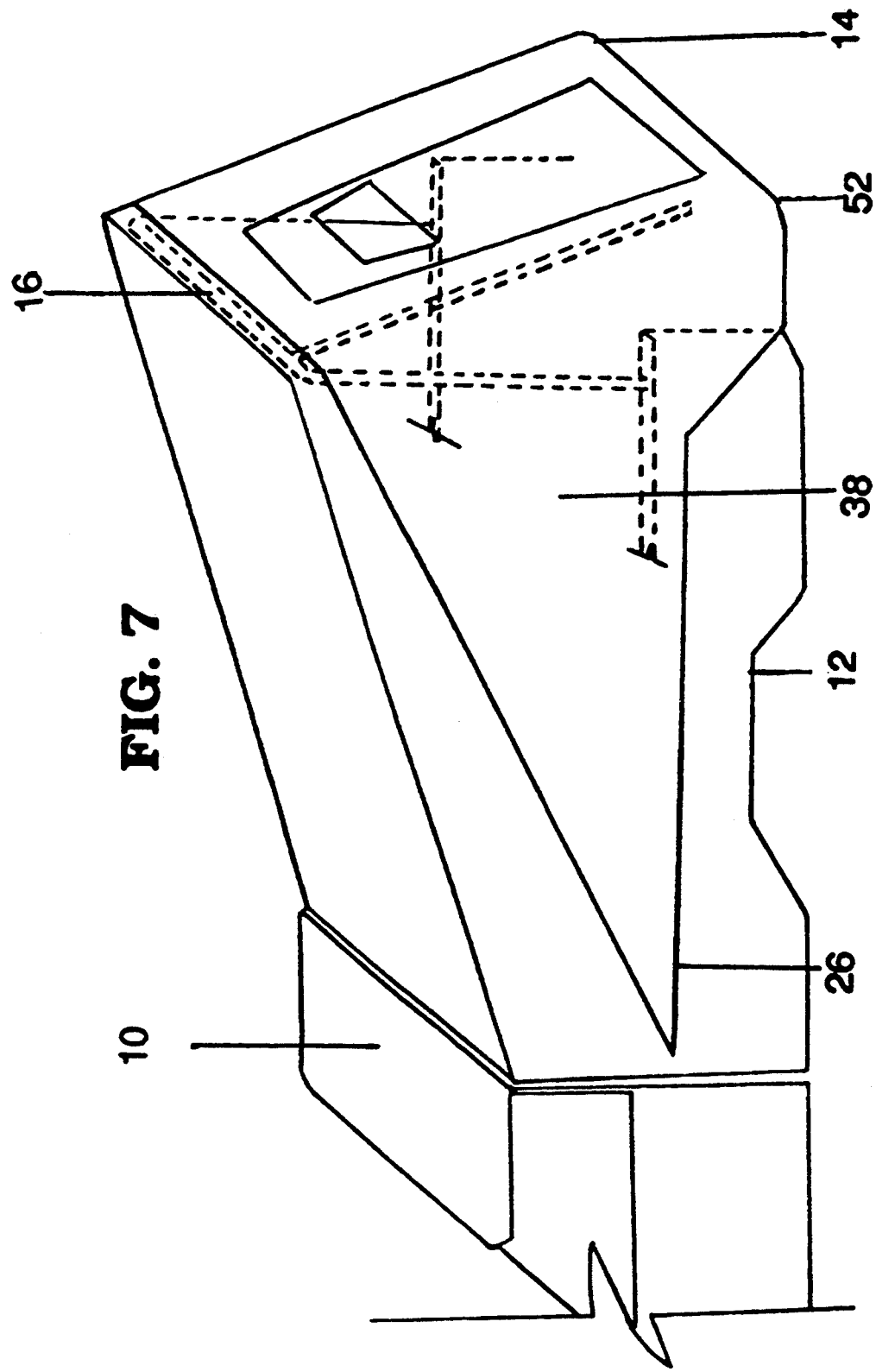

FIG. 7 shows side view of truck bed and tonneau roof and tent sides in up "for use" position.

FIG. 8 shows enclosure stored in bag secured to truck cab.

FIG. 8-A shows independent tonneau bag in which are stored tonneau top and tent camper padlocked to truck cab.

FIGS. 8-B, 8-C, 8-D show security device of straps padlocked to folding padeye which is attached to truck cab.

FIG. 8-E shows independent tonneau bag with zippered side and back, attaching straps and carrying handle.

FIG. 9 shows alternate tonneau tent with partial zippered opening shown in 9-A (side view) and 9-B (rear view).

REFERENCE NUMERALS IN DRAWINGS

10: truck cab
11: cab rear window
12: truck bed
13: tonneau top rear window and moon roof
14: tail gate
16: tube support frame
18: tonneau cover/tent shelter top
20: tube support frame bent at length
21: tube support frame bent at width
22: tonneau top front (to cab) window
26: twist stud fasteners
27: tonneau roof eye grommet hole for twist stud fastener
28: tube socket
30: hinge bracket
31: tube frame support holder
32: tonneau top lip
34: snap stud
36: snap stud cap
37: enclosure entrance door
38: enclosure sides and back of light weight material
39: mosquito net entrance door
40: tent door window
42: eye and snap hook
43: pocket in tonneau roof
44: tonneau top strap tie down
46: side strap tie
47: snap buttons
48: tube tie to tonneau roof 49: tent material zippered or sewn to tonneau top
52: tent material fitted to tail gate
56: tonneau roof cover and tent material bag
58: tonneau bag strap to cab attachment
60: folding padeye
62: padlock
64: tonneau bag back zipper
66: tonneau bag side zipper
68: tonneau bag
70: zippered side openings of alternative tonneau cover
73: reinforced cloth hinge.

DESCRIPTION FIGS.

Figure 1:
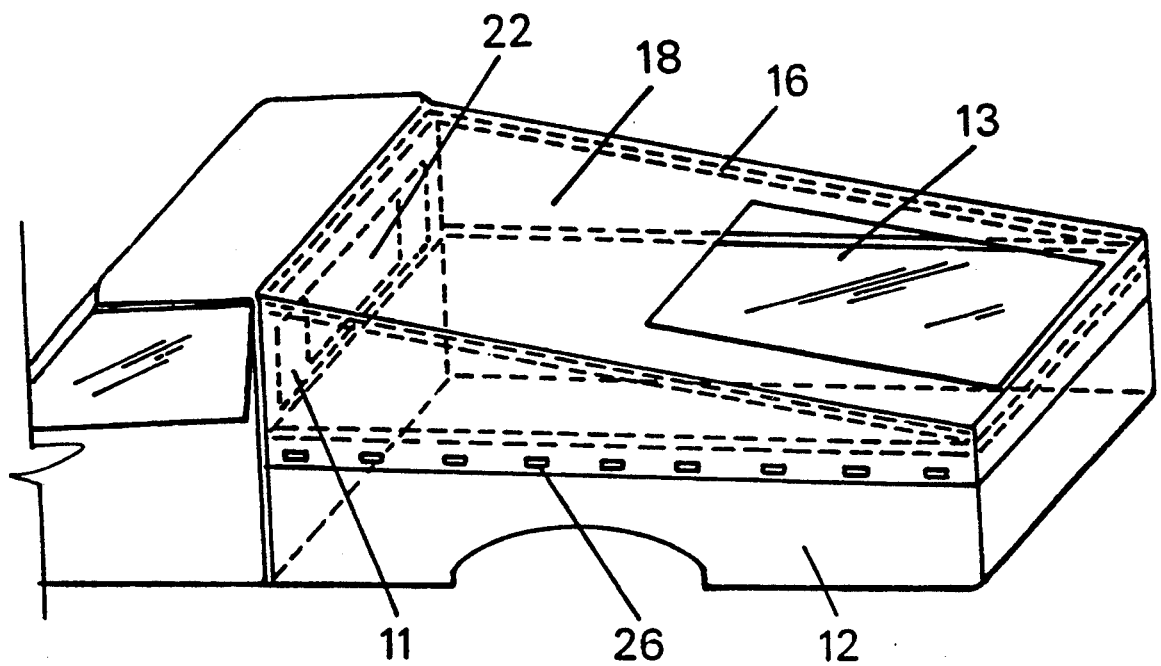
FIG. 1 shows the embodiment of the convertible truck tonneau cover and tent shelter in the down or driving position.

In FIG. 1 (perspective side and top view). Truck cab 10 and truck bed 12 are shown in the normal driving position Tonneau cover/tent roof top 18 is in the down position and attached by twist stud fasteners 26 passed through tonneau cover grommet hole 27 at truck bed sides and tail gate.

The preferred material for tonneau cover 18 is vinyl canvas or waterproof boat canvas, but any similar, waterproof material may be used.

A tube support frame 16 is shown in FIG. 2 (perspective side and top view); it acts as frame for tonneau cover 18. Tube support 16 is connected to a tube socket 28 shown blown up in FIG. 2-A. Tube socket is connected to a hinge bracket 30 that is connected to the truck bed 12 (both shown blown up in FIG. 2-B) attached 4-6 inches from tailgate with stainless steel screws. Tube support frame 16 is held in place in tube socket 28 by an alien screw.

Tube socket 28 and hinge bracket 30 are preferably made of stainless steel and are readily available in marine supply or boat supply outlets.

The preferred tube support is one to two inch in diameter and of a 0.049 thickness; it is made of chrome or polished stainless steel. Tubing is readily available in twenty foot lengths. The length of tubing is bent at 90 to 110 degree angles at length 20 and width 22. The angle of bending is made on a plumbing pipe bending tool or similar tool. The 20 foot length of tubing is adequate for all trucks; the length of tubing from cab to tailgate is cut according to truck model and size.

Chrome or polished stainless steel are the preferred material for tube support frame 16 as it will be exposed to the elements and oxidation when in the "open air" FIG. 2 position. Other rod or tube material such as aluminum, painted galvanized steel, or plastic, or fiberglass may be substituted.

FIG. 2-B shows tube support attached to the truck cab 10 with a tube frame support holder 31. This item made of hard flexible rubber is used for holding fishing rods and tools and is easily obtained in hardware or sporting good outlets.

FIG. 3 is an exploded view of a tonneau tent camper. It shows tonneau cover/tent top 18, is attached to tent material sides and back 38, when tent sides and back are stored in rolled up position in tonneau top 18 and held by cloth ties (not shown). Tube support frame 16, is attached to the truck cab and bed respectively, by the tube frame support holders 31 and tube socket 28 and hinge bracket 30 as described above and shown in FIG. 2-A.

Additionally FIG. 3 shows blown up views of the twist stud fasteners 26 which hold tonneau/roof 18 to the side of truck bed 12. FIG. 3 also shows blown up views of tonneau/top fastened to the truck cab 10 by snap studs 34 and removeable snap stud caps 36; FIG. 3 also indicates tonneau top 18 attached to the side of the truck bed 12 with twist stud fasteners 26 (blown up view) as discussed above.

FIG. 4 is a side top and shows a tonneau/top cover 18 in the up position with tent sides and back 38 rolled down in the "for tent use" position. Tonneau roof 18 and tent sides and back 38 are supported from below by the tube support 16 which sets in the lip 32 formed in the tonneau top. The tonneau top is attached to sides of truck bed 12 by twist stud fasteners 26; and to truck cab 10 by snap studs 34 as discussed above. FIG. 4 also shows tent and tonneau cover held in place by downward force of tent material fitted 52 to tailgate 14 of truck.

Side and back tent material are ultra light weight with heat and cold insulative qualities. Any light weight and durable material to which ties and plastic windows can be attached by sewing or zippering may be utilized as Nylon or other synthetic material.

FIG. 4-A is an exploded and blown up view of snap hook and eye 42 attached to tonneau strap tie down 44 from tonneau roof to eye on tailgate 42. Tonneau strap tie down is sewn to underside of tonneau top roof for further supporting enclosure.

FIG. 4-B is tonneau top 18, tonneau top combined window and moonroof 13, sides and back 38 and enclosure entrance door 37 and door window 40 shown apart from truck bed 12 for clarity purposes.

FIG. 5 is a cross section of tonneau roof, sides and back showing tube support frame 16 tonneau roof 18, tent material used for sides and back 38 and tail gate 14; it demonstrates how tube support frame is attached to underside of tonneau roof by a removable strap 48 when in up position.

Tent material sides and back 38 are sewn or zippered (shown by "invisible" dash line) 49 to tonneau top 18. Tent sides and back 38 are "sheet fitted" to tail gate 52.

FIG. 6 shows rear and right side perspective drawing of tonneau roof and tent shelter in up, "for shelter use" position. Tube support frame 16 holds up tonneau top 18; Tent sides and back 38 are sewn (not shown) to straps attached at side 46 and tailgate of truck 44. Back straps are secured to tail gate by eye and snap hook 42. FIG. 6 shows zippered (not shown) entry door 37 made of same tent material with plastic window 40 sewn (not shown) to tent door 37. Entrance door 37 is partially rolled up exposing mosquito net door 39 underneath which is also zippered 41 to tent material at rear.

FIG. 7 shows side and top view of truck bed 12 and tonneau roof 18 and tent sides in up "for shelter use" position supported by tube support frame 16 and attached to side of truck bed by twist fasteners 26 and flexible side tie strap 46 sewn to side tent material and attached to wheel well and front underside of truck frame; also shown is side view indicating how tonneau roof is attached to tent material by zipper or stitching (shown by broken line 49).

FIG. 8 shows independent tonneau bag 56 in which are stored tonneau top and tent attached to truck cab by attaching straps 58. FIG. 8-A through 8-D show tonneau bag 56 with straps 58. Ends of both straps enter tonneau bag handle 68 loops 65. Holes in loops fit over folding padeye 60 and are locked to roof with padlock 62 on both sides of bag.

FIG. 8-E shows tonneau bag as independent entity. Zippers on side 66 and back 64 and bag handle 68 allow storage of tonneau cover 18 and tent sides and back 38 apart from vehicle.

ALTERNATE TONNEAU ROOF COVER

FIG. 9 shows rear and top perspective view of alternate tonneau roof enclosure which is the original tonneau top 18 with zippered (not shown) opening made directly into tonneau roof at approximately four inches from each side and two thirds the length of the original tonneau roof 18. Does not require detaching sides of tonneau roof.

FIG. 9-A shows side view of the alternate roof in down position zippered (not shown) at openings cuts on each side of roof cover 70. The natural cloth hinge 73 is reinforced with extra material sewn (not shown) to the tonneau cover on the inside. The alternate tonneau roof 18 of FIGS. 9;9-B is supported by a detachable shortened tube support frame 16 or flexible rod which sets on floor of either corner of the truck bed 71 held by corner and downward force of tonneau strap support 44 and tent material fitted to tailgate 52.

FIG. 9-B shows side view of alternative tonneau roof and enclosure using either tubular or flexible rod to support enclosure in the place of the tube support frame 16.

OPERATION—FIGS. 1, 4, 3, 4-A, 5, 8A-E, 9A-C

To use the vehicle for driving especially on long trips tonneau top 18 is kept in the down position as seen in FIG. 1. This will provide protection for items stored in truck bed providing less air drag as well as increased fuel consumption.

Rear vision will not be impaired as driver can view through rear cab window 11 and through two plastic windows 13 and 22 sewn into tonneau top. These same windows will be utilized when the camper is completely opened for pass through to cab from camper 22 and as a moon roof 13 for viewing up and out from inside the tent.

To utilize the truck bed for hauling one needs only to remove the tonneau/top and attached tent side and back material. This is accomplished by turning twist stud fasteners 26 at sides and tailgate of truck bed 14 and detaching snap stud caps 36 from snap studs 34 at cab (FIG. 3 and FIG. 1). The tonneau top/cover can then be removed from truck cab and bed entirely and stored in tonneau bag (FIGS. 8-8-E) The tonneau bag may then be attached to roof with strap to cab attachment (FIGS. 8A-E) and padlocked as indicated in FIG. 8-A, or carried with tonneau bag handle 68 and stored in cab, bed or any other safe place.

To utilize the truck enclosure for camping, hunting or wild life photography blind one would need to detach sides of tonneau/top by turning twist stud fasteners 26 on truck bed 12 sides and tail gate 14 as described in above paragraph. Some of the tonneau cover snap stud caps 36 would be unsnapped from the snap studs only as necessary to loosen the tonneau cover close to the cab. This is done to free the tube support frame 16 from the tube support holders 31. The tube support is easily freed from the rubber tube supports with a slight upward pull on the tube support. One would now re-snap the stud caps to the cab as they will hold the tonneau top to the cab.

The tube support would slip into the pocket formed in the rear of tonneau top where top was connected to tailgate 14 and further held in position and attached to tonneau roof by means of tube tie 48 which is sewn to tonneau roof and is removable by means of snap button on one side 47 (FIGS. 4, 4-A and 5).

The tube tie straps sewn to the underside of tonneau top 48 (FIG. 5) are then attached to the inside of tailgate 14 on either side 44 by means of the snap on support snap clipping to the eye on tail gate 42 with the tailgate in the closed up position.

One would then untie the ties 48 holding the rolled up tent sides and back 38 to the tonneau roof cover (see FIG. 3) and release the material placing it outside sides of bed and tailgate. The material below the entrance door 37 is size fitted to the tailgate 14. That fitted material is slipped over the tailgate 52 (as a fitted bed sheet over a mattress) and the tailgate is pushed downward toward the ground until it snaps into the fixed open position (FIGS. 4 and 5.) This action along with the tonneau top being attached to the truck cab 10 in front by the snap studs and caps 34, 36; and the tonneau top being attached to the rear tailgate 14 with the strap connected to the eye 42 on the tailgate, forces the entire tent camper into a rigid upright position as seen in FIGS. 4-6.

One needs only to attach the tent sides to the truck bed 12 with either of both the twist stud fasteners 26 originally used to hold the tonneau cover to the truck bed or with flexible side strap tie downs 46 attached to tent side material (FIGS. 4 and 7) and underside of wheel well and truck bed.

The rear camper to cab window 22 would be openable to the cab if there is a sliding window in the cab. The tonneau top rear view window would become a "moon roof" for star gazing.

OPERATION OF ALTERNATIVE TENT CAMPER

FIGS. 9 through 9-B show an alternative form of the tonneau tent camper wherein a small portion of the tonneau top is opened only at the rear tailgate 14 of the vehicle. The zippered sides 70 of alternative tonneau roof (zipper not shown) of the tonneau cover (as seen in FIG. 9-A) would be unzippered and the twist stub fasteners 26 removed only at the tailgate. The zippered section would then be raised and the side and back light weight tent material sewed or zippered to the alternate tonneau roof top 72 and rolled and stored there would be freed. A detachable tube support made of flexible metal, plastic or fiberglass is placed in the tonneau roof pocket 43 as per the previous installation. The fitted tent material 52 would again be placed over the tailgate 14 and the tonneau top strap tie downs 44 attached to the eye and snap hook 42. The downward pressure of the tailgate in its locked open position and tonneau straps would hold the tent camper in place.

The result would be a lower (in height) but similar area for sleeping. The entrance and moon roof window would remain the same. This alternate form would eliminate the fixed tube support frame 16, the hardware for the securing of the tube support including the tube socket 28, hinge bracket 30, and tube support holder 31. It would eliminate all of the assembly and removal of the tonneau cover and snap studs from sides of truck bed. Set up would require the un-twisting of several stud fasteners on the tail gate 14 and placement of a shaped or flexible pole 74 in the rear corners of the truck bed to support the tonneau roof (FIG. 9 and FIGS. 4, 4-A, 5 through 5-E).

SUMMARY, RAMIFICATIONS AND SCOPE

The tonneau tent camper then provides one with a portable above the ground shelter that is easily assembled by one person in ten minutes or less. The entire tonneau cover and tent camper can be dismantled and stored in a provided bag which in turn can be stored and locked on the roof of the truck cab or other location. The stainless steel or chrome tube support frame safely attaches to the truck cab as well and the chrome tube and tube shaped storage bag provide a streamlined and good looking custom look to the pick-up truck as well as free the entire truck bed for use.

Finally in the FIG. 1 enclosed position the tonneau cover/top supported by the tube support frame becomes a tonneau cover and protects any contents of the truck bed. The tonneau cover also provides the truck bed with an aerodynamic contour. That figuration creates less air drag and increased fuel consumption; it also enhances cosmetic appearance by creating a uniform wedge shaped style in the place of the box shaped truck body and cab configuration.

Although the description above concerns many specifics they should not be construed as limiting the scope of the invention but as merely providing some of the preferred embodiments of that invention. For example the tent enclosure can have other shapes such as circular, oval, triangular, etc. in accordance with the type of support system utilized. For example the alternate use of a removeable flexible pole in the place of the tube support reduces fabrication costs and installation time as well as reduces actual set up time of enclosure while the tonneau cover in the down (FIG. 1) would be self supporting due to stretching effect of tonneau top material when attached to truck cab and bed by fasteners described above.

Thus the scope of the invention should be determined by the appended claims and their legal equivalents, rather than by the examples given.

I claim:

1. A combined pickup truck bed cover and tent comprising:

a cover of flexible material detachably fastened to a pickup cab rear wall and upper portions of sidewalls of the pickup bed by fastening means; the cover having a generally planar top wall extending from an upper portion of the cab to a rear portion of the bed, a generally triangular side wall extending from the top wall to one of the bed sidewalls, a C-shaped support frame having pivotal attachment means to upper portions of the bed sidewalls; at least one support holder secured to the upper portion of the cab rear wall for detachable fastening of a bight portion of the support frame;

the support frame underlying and supporting the cover at an acute angular relationship to the upper portions of the bed sidewalls and detachable from the support holder to enable pivotal movement about the pivotal attachment means to a generally upright position to support the cover in an elevated position as a tent; means securing the support frame to the cover in the upright position, and means tensioning the elevated cover and support frame in the upright position, said tensioning means fastened to a tailgate of the bed.

2. The cover and tent of claim 1, further comprising means bridging the cover side wall and one sidewall of the bed with the cover in the elevated position.

3. The cover and tent of claim 1, further comprising a cover front wall generally congruent with the cab rear wall.

4. The cover and tent of claim 3, further comprising a window mounted in the cover front wall and an additional window in the cover top wall.

* * * * *

UNITED STATES PATENT AND TRADEMARK OFFICE
CERTIFICATE OF CORRECTION

PATENT NO. : 5,335,960
DATED : August 9, 1994
INVENTOR(S) : Benignu, Jr.

It is certified that error appears in the above-indentified patent and that said Letters Patent is hereby corrected as shown below:

On the title page Item [19] and Item [75] Inventor name "Benignu" should read --Benigno--

Signed and Sealed this

Tenth Day of October, 1995

*Attest:*

BRUCE LEHMAN

*Attesting Officer*  *Commissioner of Patents and Trademarks*